(12) United States Patent
Pang

(10) Patent No.: US 9,342,161 B2
(45) Date of Patent: May 17, 2016

(54) OPTICAL POINTING DEVICE AND CORRESPONDING METHOD FOR CONCURRENTLY PERFORMING GAIN CONTROL AND IMAGE CAPTURING FOR NAVIGATION OF OPTICAL POINTING DEVICE DURING ONE LED TURNED-ON TIME PERIOD

(71) Applicant: PixArt Imaging Inc., Hsin-Chu (TW)

(72) Inventor: Kwai Lee Pang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 136 days.

(21) Appl. No.: 14/231,741

(22) Filed: Apr. 1, 2014

(65) Prior Publication Data

US 2015/0277588 A1 Oct. 1, 2015

(51) Int. Cl.
*G06F 3/03* (2006.01)
*G06F 3/0354* (2013.01)

(52) U.S. Cl.
CPC .................................. *G06F 3/03543* (2013.01)

(58) Field of Classification Search
CPC combination set(s) only.
See application file for complete search history.

(56) References Cited

U.S. PATENT DOCUMENTS

| 6,836,288 | B1* | 12/2004 | Lewis | H04N 5/2352 348/221.1 |
| 7,738,019 | B2 | 6/2010 | Misek | |
| 8,099,200 | B2* | 1/2012 | Coombs | B62K 23/00 701/4 |
| 2005/0024246 | A1* | 2/2005 | Fujihara | H03M 1/1028 341/120 |
| 2006/0181628 | A1* | 8/2006 | Kishi | H04N 3/1512 348/308 |

FOREIGN PATENT DOCUMENTS

| TW | 200905529 | 2/2009 |
| TW | 201405379 | 2/2014 |

* cited by examiner

*Primary Examiner* — Van Chow
(74) *Attorney, Agent, or Firm* — Winston Hsu; Scott Margo

(57) ABSTRACT

An optical pointing device includes a light emitting unit, a pixel array, a gain controlling circuit, and a processing circuit. The light emitting unit is used for emitting light to a surface. The pixel array is used for sensing the light reflected from a surface to generate at least one sense resultant signal. The gain controlling circuit is used for controlling a gain value for the at least one sense resultant signal, to avoid signal saturation. The processing circuit is used for performing image capturing for a navigation of the optical pointing device. The gain controlling circuit and the processing circuit concurrently control the gain value and perform the image capturing for the navigation of the optical pointing device.

15 Claims, 4 Drawing Sheets

OPTICAL POINTING DEVICE AND CORRESPONDING METHOD FOR CONCURRENTLY PERFORMING GAIN CONTROL AND IMAGE CAPTURING FOR NAVIGATION OF OPTICAL POINTING DEVICE DURING ONE LED TURNED-ON TIME PERIOD

BACKGROUND OF THE INVENTION

1. Field of the Invention

The present invention relates to an optical pointing scheme, and more particularly to an optical pointing device and a method used in the optical pointing device.

2. Description of the Prior Art

In general, a conventional optical mouse sensor receives light reflected from a surface on which the optical mouse is placed, and senses image data. The conventional optical mouse may turn on a light-emitting diode (LED) for emitting light twice. The conventional optical mouse turns on the LED the first time an operation of gain control is executed, and the conventional optical mouse turns on the LED the second time an operation of image capturing for a navigation of the optical mouse based on a result of the operation of gain control. For the conventional optical mouse, a time period employed by the operation of conventional gain control is slightly longer than a time period which is used for the operation of image capturing. In addition, the operation of conventional image capturing is executed based on the operation of convention gain control, and both of the operations are executed based on the same pixel units of the conventional optical mouse. Thus, it is necessary for the conventional optical mouse to turn on the LED for emitting light twice. However, emitting light twice causes more power consumption for the conventional optical mouse, especially for a wireless optical mouse. It is important to provide a novel scheme to reduce power consumption.

SUMMARY OF THE INVENTION

Therefore one of the objectives of the present invention is to provide an optical pointing device and a method used in the optical pointing device, to solve the above-mentioned problem.

According to an embodiment of the present invention, an optical pointing device including a light emitting unit, a pixel array, a gain controlling circuit, and a processing circuit is disclosed. The light emitting unit is used for emitting light to a surface. The pixel array is used for sensing the light reflected from a surface to generate at least one sense resultant signal. The gain controlling circuit is used for controlling a gain value for the at least one sense resultant signal, to avoid signal saturation. The processing circuit is used for performing image capturing for a navigation of the optical pointing device. The gain controlling circuit and the processing circuit concurrently control the gain value and perform the image capturing for the navigation of the optical pointing device.

According to the embodiment of the present invention, a method used in an optical pointing device is disclosed. The method comprises: using a pixel array for sensing light reflected from a surface to generate at least one sense resultant signal; controlling a gain value for the at least one sense resultant signal, to avoid signal saturation; and performing image capturing for a navigation of the optical pointing device. The step of controlling the gain value and the step of performing the image capturing are concurrently executed.

According to the embodiment, by concurrently executing the operation of gain controlling and the operation of image capturing for the navigation of optical pointing device, it is not required to turn on the light emitting diode twice respectively for the operations of gain controlling and image capturing, and power consumption can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
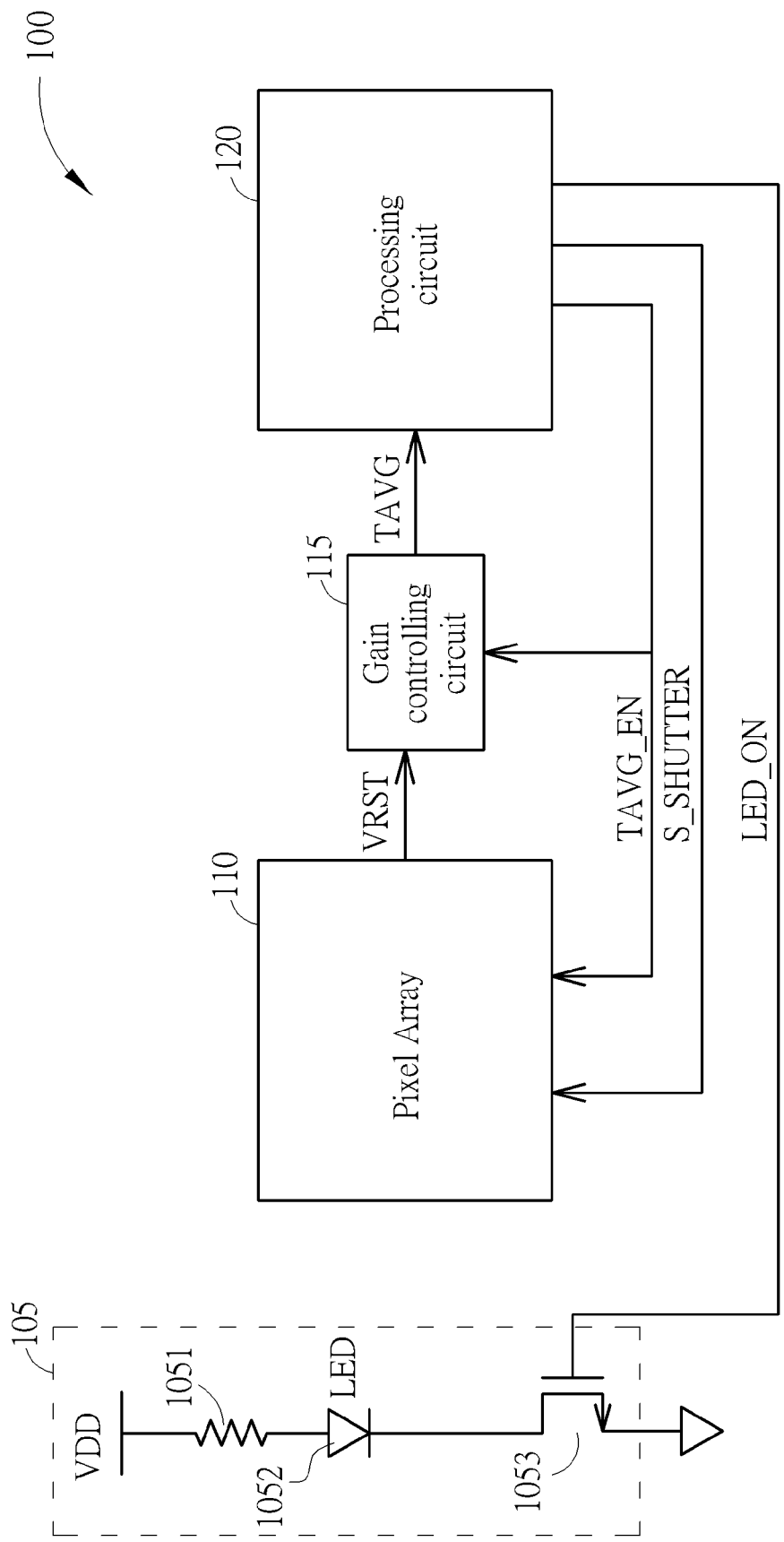
FIG. 1 is a diagram of an optical pointing device according to an embodiment of the present invention.

Please refer to FIG. 1, which is a diagram of an optical pointing device 100 according to an embodiment of the present invention. The optical pointing device 100 such as an optical mouse comprises a light emitting unit 105, a pixel array 110, a gain controlling circuit 115, and a processing circuit 120. The light emitting unit 105 comprises a resistor unit 1051, a light-emitting diode (LED) 1052, and an LED driver 1053. The light emitting unit 105 is utilized for emitting light to a surface on which the optical pointing device 100 is placed. The pixel array 110 including a plurality of pixels is used as a sensor to sense the light reflected from the surface to generate and output at least one sense resultant signal to the next stage circuit, i.e. the gain controlling circuit 115 and the processing circuit 120. The at least one sense resultant signal triggers the operations of the gain controlling circuit 115 and the processing circuit 120. The gain controlling circuit 115 is utilized for controlling a gain value for the at least one sense resultant signal, and more specifically the gain controlling circuit 115 may be implemented by an auto-gain controller (AGC) which is used for determining the appropriate gain value for the at least one sense resultant signal to prevent the at least one sense resultant signal from being saturated. When the appropriate gain value is determined, the processing circuit 120 is arranged to perform image capturing based on the appropriate gain value to obtain an improved image quality for a navigation of the optical pointing device 100. The gain controlling circuit 115 and the processing circuit 120 respectively and concurrently control the gain value and perform the image capturing for the navigation. Specifically, the gain controlling circuit 115 determines the gain value within a time period which the processing circuit 120 turns on the light emitting unit 105 to emit light and turns on a shutter for performing the image capturing for the navigation of the optical pointing device 100.

In addition, the light-emitting unit 105, pixel array 110, and the gain controlling circuit 115 are controlled by the processing circuit 120. More specifically, the processing circuit 120 is utilized for enabling the light emitting unit 105 by sending a signal LED_ON to enable the LED driver 1053, enabling image capturing for the navigation of optical pointing device 100 by sending a signal S_SHUTTER to trigger the pixel array 110, and enabling auto-gain controlling by sending a signal TAVG_EN to trigger the pixel array 110 and the gain controlling circuit 115. In this embodiment, during a consecutive time period which the light emitting unit 105 is enabled for emitting light, the operation of image capturing for navigation of the optical pointing device 100 and the operation of auto-gain controlling are concurrently triggered and performed/executed. The operation of auto-gain controlling is more sensitive to data of the light signal sensed by the pixel array 110, to rapidly generate and output a pulse-width-modulated signal TAVG to the processing circuit 120 so that the processing circuit 120 can perform image capturing for navigation data of the optical pointing device 100 based on the pulse-width-modulated signal TAVG in time during the consecutive time period which the light-emitting unit 105 is enabled for emitting light. Accordingly, compared to a conventional scheme, it is not required for the optical pointing device 100 to enable the light-emitting unit 105 to emit light for the operation of auto-gain controlling before the consecutive time period mentioned above. That is, by turning on the LED for a consecutive period one time, both of the operation for auto-gain controlling and operation for image capturing for navigation data can be performed and completed. It is not required to turn on the LED twice for auto-gain controlling and image capturing. Thus, power consumption can be reduced since this eliminates a length of LED turned-on period.

Figure 2:
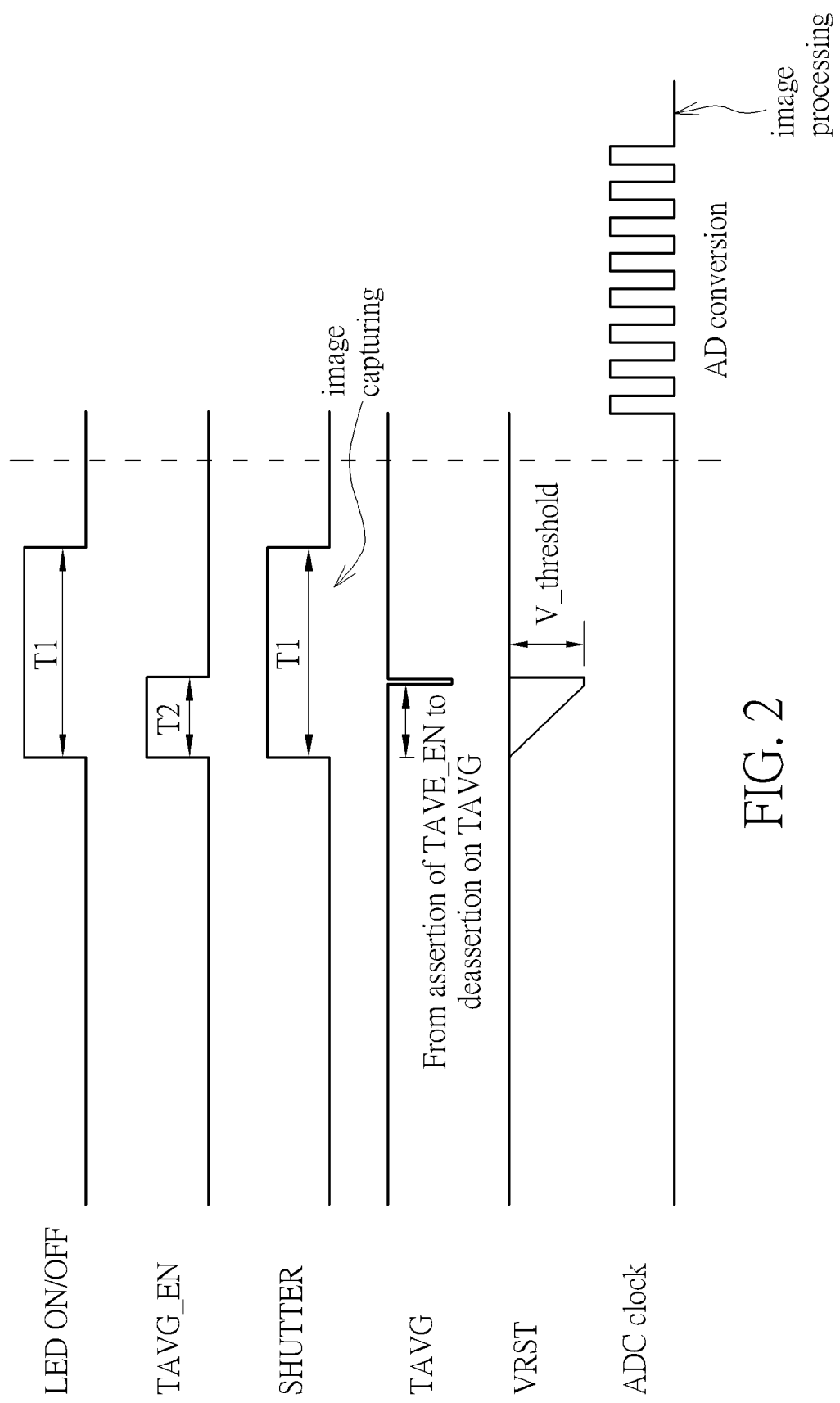
FIG. 2 is a timing diagram illustrating the operations of the gain controlling circuit and processing circuit as shown in FIG. 1.

Please refer to FIG. 2, which is a timing diagram illustrating the operations of the gain controlling circuit 115 and processing circuit 120. In this embodiment, during the time period which the LED is tuned on, the gain controlling circuit 115 and processing circuit 120 respectively and concurrently perform auto-gain controlling for the light signal and perform image capturing for the navigation of optical pointing device 100. As shown in FIG. 2, the high logic level of signal LED ON/OFF indicates that the LED is tuned on for a time period T1, and its low logic level indicates that the LED is turned off. The assertion of TAVG_EN and the de-assertion of TAVG indicate the beginning of auto-gain controlling and end of auto gain controlling respectively. That is, the transition from low logic level to high logic level of signal TAVG_EN indicates the beginning of auto-gain controlling, and the gain controlling circuit 115 is arranged to determine the appropriate gain value for the light signal when begins to perform auto-gain controlling. The transition from high logic level to low logic level (i.e. de-assertion) of signal TAVG indicates the end of auto-gain controlling, and the gain controlling circuit 115 is arranged to stop performing auto-gain controlling. The high logic level of signal SHUTTER indicates a time period which is employed by the processing circuit 120 to perform image capturing for the navigation of optical pointing device 100, and its low logic level indicates that the shutter is not switched on.

The signal VRST indicates an example of the voltage of reset capacitor discharged. The processing circuit 120 is arranged to switch on the shutter during the time period T1 while the LED is controlled by the processing circuit 120 to be enabled for emitting light during T1. Concurrently, at the beginning of the time period T1, the gain controlling circuit 115 is controlled by the processing circuit 120 to perform the operation of auto-gain controlling for a time period T2 which is shorter than T1. The time period T2 employed by the gain controlling circuit 115 for controlling the gain value is determined to be shorter than the time period T1 which the shutter is turned on for the image capturing. After time period T2 and before the end of time period T1, the processing circuit 120 can perform the image capturing for the navigation of optical pointing device 100 based on the gain value determined by the gain controlling circuit 115 to obtain improved image quality. Further, during the time period T2 specified by the signal TAVG_EN, the gain controlling circuit 115 and processing circuit 120 are arranged to acquire estimation of image profile prior to saturation and arranged to feedback the information of estimated image profile to a controller (not shown in FIG. 2) to define the shutter pulse width/period (when the shutter is de-asserted). The shutter is concurrently turned on to capture or acquire real image(s). When the operation of shutter is completed, the information of estimated image profile is sampled by an analog-to-digital (ADC) circuit and passed forward to the controller for image processing. Thus, the operations of gain controlling and image capturing are performed concurrently. The time period of the pulse-width modulated signal TAVG is defined from the assertion of signal TAVG_EN and the de-assertion of signal TAVG.

Figure 3:
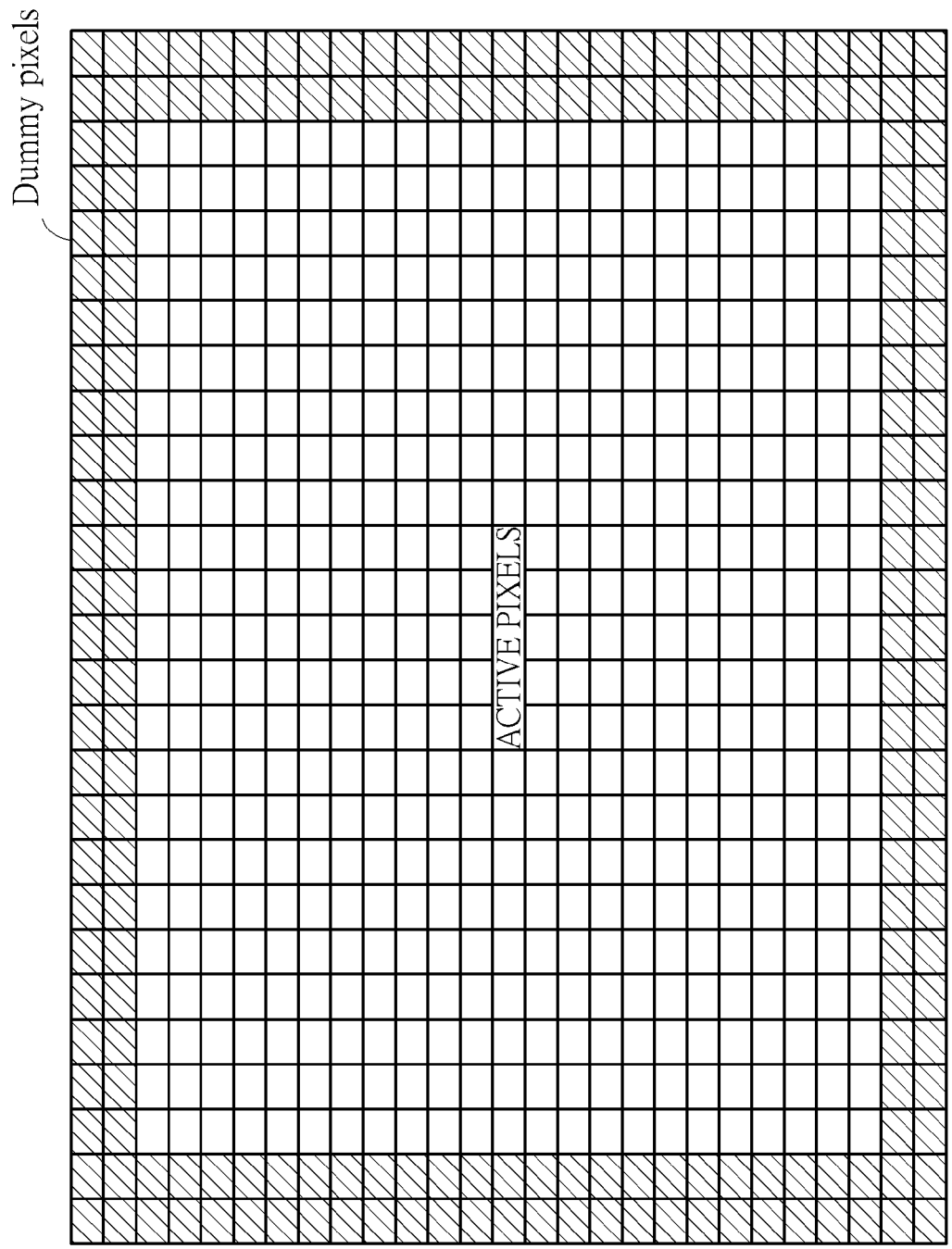
FIG. 3, which is a diagram illustrating pixels of the pixel array as shown in FIG. 1.

Please refer to FIG. 3, which is a diagram illustrating pixels of the pixel array 110 as shown in FIG. 1. As shown in FIG. 3, the pixel array 110 includes a portion of first pixels such as dummy pixels and a portion of second pixels such as active pixels. In this embodiment, the portion of dummy pixels is configured as a pixel ring surrounding the portion of active pixels. However, this is not intended to be a limitation of the present invention. The dummy pixels are used for sensing light reflected from the surface and generating a sense resultant signal which is used by the gain controlling circuit 115 for performing the operation of auto-gain controlling (i.e. determining the appropriate gain value). The active pixels are used for sensing light reflected from the surface and generating a sense resultant signal which is used by the processing circuit 120 for performing the operation of image capturing for the navigation of optical pointing device 100. By using the dummy pixels and active pixels, the gain controlling circuit 115 and processing circuit 120 can respectively and concurrently perform the operation of auto-gain controlling and the operation of image capturing for the navigation of optical pointing device 100.

In addition, the operation of auto-gain controlling can be performed more sensitively. For example, the operation of auto-gain controlling can be more sensitive by increasing the number of the dummy pixels as shown in FIG. 3. That is, by applying more dummy pixels for auto-gain controlling, the operation of auto-gain controlling can be triggered and completed more rapidly.

Figure 4:
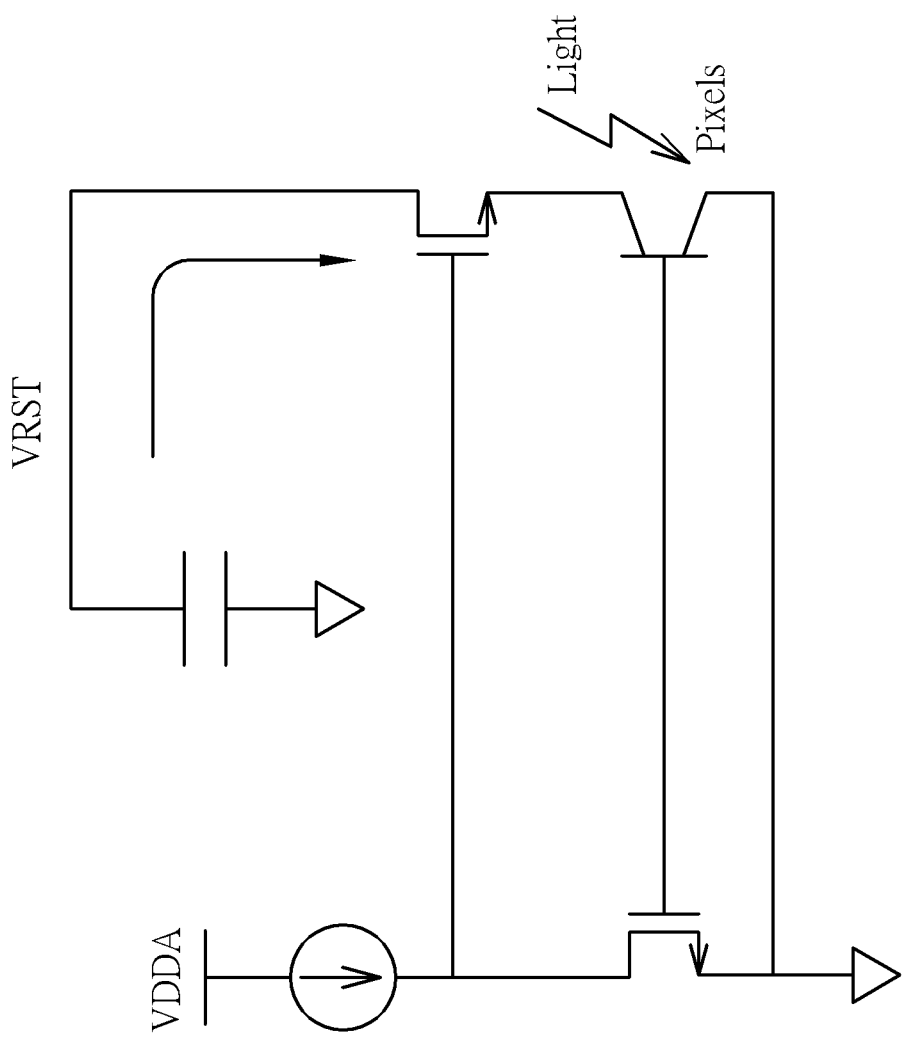
FIG. 4 is a diagram illustrating a simplified circuit for a dummy pixel as shown in FIG. 3.

In addition, the operation of auto-gain controlling can be performed more sensitively by using other meanings. Please refer to FIG. 2 in conjunction with FIG. 4. FIG. 4 is a diagram illustrating a simplified circuit for a dummy pixel as shown in FIG. 3. As shown in FIG. 4, the capacitor CAP corresponding to one pixel within the dummy pixels is initially pre-charged to the level of VDDA. When the signal TAVG_EN as shown in FIG. 2 is at the high logic level, the gain controlling circuit 115 determines the appropriate gain value for the light signal to perform auto-gain controlling, and the voltage VRST at the capacitor CAP is discharged towards to the ground level. Once the difference between the initially per-charged voltage level VDDA and the voltage discharged exceeds above a threshold voltage V_threshold about a voltage discharge difference, the gain controlling circuit 115 completes the operation of auto-gain controlling and outputs the pulse-width modulated signal TAVG to the processing circuit 120. By designing/configuring the capacitance of the capacitor CAP as a value smaller than the capacitance of a capacitor corresponding to one pixel within the active pixels, this can make the operation of auto-gain controlling become more sensitive. In addition, decreasing the value of threshold voltage mentioned above can make the discharge time become shorter so that the operation of auto-gain controlling becomes more sensitive. That is, by decreasing a discharge time for the capacitor CAP or decreasing the value of threshold voltage, the time period employed for controlling the gain value can be decreased. All these modifications are helpful for making the operation of auto-gain controlling become more sensitive, to ensure that the pulse-width modulated signal TAVG can be triggered and transmitted to the processing circuit 120 in time within the time period of T1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical pointing device, comprising:
    a light emitting unit, for emitting light to a surface;
    a pixel array, for sensing the light reflected from a surface to generate at least one sense resultant signal;
    a gain controlling circuit, coupled to the pixel array, for controlling a gain value for the at least one sense resultant signal; and
    a processing circuit, coupled to the gain controlling circuit, for performing image capturing for a navigation of the optical pointing device based on the gain value;
    wherein the gain controlling circuit and the processing circuit concurrently control the gain value and perform the image capturing for the navigation of the optical pointing device.

2. The optical pointing device of claim 1, wherein the gain controlling circuit is used for determining the gain value within a time period which the processing circuit turns on the light emitting unit to emit light and turns on a shutter for performing the image capturing for the navigation of the optical pointing device.

3. The optical pointing device of claim 1, wherein the pixel array comprises a portion of first pixels and a portion of second pixels; and the portion of first pixels is used by the gain controlling circuit to determine the gain value while the portion of second pixels is used by the processing circuit for the navigation of the optical pointing device.

4. The optical pointing device of claim 3, wherein the portion of first pixels is a group of dummy pixels and the portion of second pixels is active pixels.

5. The optical pointing device of claim 4, wherein the dummy pixels form a pixel ring surrounding the active pixels.

6. The optical pointing device of claim 3, wherein a capacitance of a capacitor corresponding to one pixel within the portion of first pixels is configured as a value smaller than a capacitance of a capacitor corresponding to one pixel within the portion of second pixels.

7. The optical pointing device of claim 1, wherein a time period employed by the gain controlling circuit for controlling the gain value for the at least one sense resultant signal is shorter than a time period which a shutter is turned on by the processing circuit for the image capturing.

8. A method used in an optical pointing device, comprising:
    using a pixel array for sensing light reflected from a surface to generate at least one sense resultant signal;
    controlling a gain value for the at least one sense resultant signal; and
    performing image capturing for a navigation of the optical pointing device based on the gain value;
    wherein the step of controlling the gain value and the step of performing the image capturing are executed concurrently.

9. The method of claim 8, wherein the step of controlling the gain value comprises:
    determining the gain value within a time period which a light emitting unit is turned on to emit light and a shutter is turned on for performing the image capturing.

10. The method of claim 8, wherein the pixel array comprises a portion of first pixels and a portion of second pixels, and the step of controlling the gain value comprises:
    determining the gain value by using the portion of first pixels; and
    the step of performing the image capturing comprises:
    performing the image capturing for the navigation of the optical pointing device by using the portion of second pixels.

11. The method of claim 10, wherein the portion of first pixels is a group of dummy pixels and the portion of second pixels is active pixels.

12. The method of claim 11, wherein the dummy pixels form a pixel ring surrounding the active pixels.

13. The method of claim 10, further comprising:
    configuring a capacitance of a capacitor corresponding to a pixel within the portion of first pixels to be smaller than a capacitance of a capacitor corresponding to a pixel within the portion of second pixels.

14. The method of claim 8, further comprising:
    determining a time period employed for controlling the gain value to be shorter than a time period which a shutter is turned on for the image capturing.

15. The method of claim 8, further comprising:
    decreasing a time period employed for controlling the gain value by decreasing a discharge time for a capacitor corresponding to the operation of controlling the gain value so as to make the decreased discharge time correspond to a lower value of a threshold voltage about a voltage discharge difference.

* * * * *